United States Patent [19]

Qvarnström

[11] Patent Number: 4,481,893
[45] Date of Patent: Nov. 13, 1984

[54] METHOD AND APPARATUS FOR AUTOMATICALLY HANDLING REUSABLE SEEDLING UNITS

[75] Inventor: Bengt G. L. Qvarnström, Falun, Sweden

[73] Assignee: Stora Kopparbergs Bergslags AB, Falun, Sweden

[21] Appl. No.: 449,382

[22] Filed: Dec. 13, 1982

Related U.S. Application Data

[63] Continuation-in-part of Ser. No. 267,883, May 27, 1981, Pat. No. 4,408,549.

[30] Foreign Application Priority Data

Jun. 13, 1980 [SE] Sweden .............................. 8004415

[51] Int. Cl.³ .......................................... A01C 11/02
[52] U.S. Cl. ........................................ 111/2; 47/1 A; 47/58; 414/417
[58] Field of Search ................. 47/1, 1 A, 73, 58; 53/53, 57, 494, 549; 414/404, 417; 111/1–3; 141/94, 231–233; 221/2, 4, 5, 6, 8, 9, 11, 13, 14, 17, 21, 69, 108; 209/548, 562–564, 552, DIG. 936

[56] References Cited

U.S. PATENT DOCUMENTS

| | | | |
|---|---|---|---|
| 2,040,436 | 5/1936 | Howard | 209/548 |
| 2,773,596 | 12/1956 | Bartlett | 209/562 |
| 3,126,088 | 3/1964 | Dudas | 53/494 X |
| 3,331,532 | 7/1967 | Hori | 47/56 X |
| 3,380,586 | 4/1968 | Frobese et al. | 209/562 |
| 3,440,432 | 4/1969 | Justis | 209/548 X |
| 3,445,981 | 5/1969 | Hori | 47/56 X |
| 3,674,140 | 7/1972 | File | 53/53 X |
| 3,903,643 | 9/1975 | Blackmore et al. | 47/77 |
| 3,956,869 | 5/1976 | Slather et al. | 53/53 |
| 3,962,822 | 6/1976 | Walters | 47/74 |
| 4,197,674 | 4/1980 | Blackmore | 47/73 |
| 4,215,513 | 8/1980 | Dedolph | 47/56 |
| 4,299,326 | 11/1981 | Ulch | 209/564 |
| 4,349,998 | 9/1982 | Covert | 53/53 |
| 4,408,549 | 10/1983 | Qvarnström | 47/1 A |

Primary Examiner—James R. Feyrer

[57] ABSTRACT

Apparatus for automatically inspecting seedling units containing growth medium and arranged in rows and columns in the form of a matrix of pot-cells tray like containers, uses a retractable gang-sensor unit which is in the form of a sensor bridge to identify individual pot cells which do not contain an acceptable seedling or do not have any germination. Pot cells so identified are remembered as to their location in the matrix and are evacuated by vertically downward moving plungers. Pot cells which are thus emptied may be filled with acceptable seedlings together with the growth medium, so that each tray contains a totality of acceptable seedlings. Trays thus processed can be used for elevated growing of seedlings with maximum utility of space in the green house where the seedlings are grown. The tray like container is advanced each time a sensing and evacuating operation is completed. Advantageously, if any plunger malfunctions and does not retract after an evacuating operation, the malfunctioning plunger actuates a switch controlled by a laser beam and stops the operation, thereby calling for manual intervention.

20 Claims, 6 Drawing Figures

METHOD AND APPARATUS FOR AUTOMATICALLY HANDLING REUSABLE SEEDLING UNITS

FIELD OF THE INVENTION

This is a continuation-in-part application from U.S. Ser. No. 06/267,883 filed on May 27, 1981 now U.S. Pat. No. 4,408,549.

This invention generally relates to improvements in apparatus for elevated growing of seedlings in a greenhouse using pots containing a growth medium, the seedlings being for later replantation at a site; more particularly, the invention concerns apparatus and method for improving the efficiency of space utilization in a greenhouse by automation of detection of pots either having a dead seedling or no seedling, and by automatically replacing a healthy seedling where needed.

BACKGROUND OF THE INVENTION

Mass growing of seedlings is commonly done on a commercial scale in greenhouses, either for resale of seedlings as such or for subsequent replantation in sites chosen for reforestation. It is also common procedure in large-scale farming operations for crops and the like, for germinating and growing seedlings in containers till such time the seedlings are ready for replantation in the field. Invariably, the seedlings are started from seeds inserted into a growth medium and grown in a controlled atmosphere such as a greenhouse till the seedlings reach a desired size. In operations involving large numbers of seedlings, it is expedient to devise arrangements wherein the required facilities are provided in the most economical and the best way possible, at the same time ensuring that the handling and rehandling of the seedlings are curtailed to a minimum. It is common practice nowadays to have arrangements wherein several seedlings can be germinated and grown in suitable large containers which may have pot-like compartments and which can be handled and taken care of conveniently and transported easily at the time of replanting. A co-pending application entitled "Seedling Transplant Unit," Ser. No. 06/321,328 and filed on Feb. 4, 1981, describes the construction of an improved arrangement for a seedling unit, facilitating easy dislodging and removal of root lumps without damage, for transplanting purposes. The seedling unit in said co-pending application is generally in the form of a plurality of pot cells joined together in the form of a tray-like structure. The pot cells may be made of a durable quality of plastics, e.g., ABS, or polypropylene or polystyrene. Either the whole seedling unit is formed in one piece or it is made by joining individually produced pots by gluing or welding or fixing into a screen of plastic or metal. The description of the "Seedling Transplant Unit" of the above-referenced pending U.S. application (Ser. No. 06/231,328) is incorporated herein by reference.

The seedling units of the type described above are usually filled with a growth medium preferably as described in international patent application PCT/SE No. 79/00229. Examples of suitable growth media include peat, or mixtures of peat, fibers and/or mull. Seeds are placed in the pots in a known way per se. The seedling units are then placed in an appropriate stand in a greenhouse wherein the underside of the seedling unit is preferably surrounded by air. By supplying suitable quantities of water and nourishment in the presence of light, the seedlings are allowed to grow to the desired size. Subsequently, the seedling units are transported out into the field or a reforestation area where the seedlings are separated and planted individually. The emptied seedling units are then returned to the greenhouse for re-use.

Statistically, a certain percentage of seeds in every batch does not sprout in time to become seedlings, or, they do not sprout at all. There may be some seedlings which start normally, but dry up too soon either because of malnourishment or because of physical damage. Such occurrences are conceivable because, in large-scale seedling operations, feeding of water and nourishment to the trays is usually mechanized, and, a slight misalignment of the feeding or watering mechanism with respect to the trays or the seedling units could result in some seedlings being missed out and/or damaged. There are yet other seedlings which start normally, but are located physically off-center in their respective pots. Such seedlings face the danger of not surviving when transplanted permanently, because of either ill developed roots which cannot support a healthy seedling, or because of the roots undergoing transplant shock owing to their eccentrically being located in the root lump and consequently not having had sufficient protection from the growth medium.

There are also several pots in every batch of seedlings wherein the seeds do not germinate at all; besides such nongerminating pots wasting the water and nourishment facilities in the greenhouse, they additionally create the necessity of having to deliberately sort them out so as to isolate them before the trays are sent out for field transplantation. If such presorting is not done, and if transplantation in the field is done mechanically, the lump of growth medium that is taken out of a nongerminated pot would be wastefully transplanted at an assigned spot which could have been occupied by a healthy seedling; or, if the transplantation in the field is done manually, the chances are that a nongerminated pot in the tray will be left untouched with its hardened growth medium. When the seedling tray is eventually returned to the greenhouse for re-use, the nongerminated pots will have to be necessarily emptied preferably manually before the trays can again be filled with fresh growth medium before seeding.

While the problems caused by seedlings that have grown completely off center in a pot can be tackled and resolved in a relatively simple manner, the matter of nongerminating seeds poses problems which require serious consideration. The costs incurred in the greenhouse maintenance and upkeep which comprise labor, cost of running the mechanized equipment, cost of plant food as well as the cost of the growth medium have to be applied to only the seedling that can be turned out with success; a large percentage of nongerminating seeds in pots, and a significant reject rate in seedlings either because they are too much off center or because they have prematurely dried would drive up the total operating costs and would result in a very uneconomical use of the greenhouse facilities. The problem of seeds not germinating at all totally, has been partly solved by inserting more than one seed in a pot, say two seeds. The germinating rate of seed depends among other things on the quality of the seeds, the plant species and to some extent on the external conditions. For some known species of trees, the germination rate is so notoriously poor that drop out of up to 40% is not uncommon. However, even though the probablity of positively having a seedling in each pot is increased by inserting more than one seed in each pot, there will be several pots where more than one seedling will result. At some stage of seedling growth in the greenhouse, or as a last resort in the field during transplantation, multiple seedlings will have to be separated from the pots which are sorted out. This again results in more manual intervention and higher costs.

The invention also teaches a method of preparing seedling trays wherein root-lumps of nonsuccessful seedlings are ejected after the unsuccessful seedling is sensed by the sensor bridge. Besides savings in the supplied nutrients, one other significant advantage of identifying and evacuating nonsuccessful pot cells is that the handling of the trays will be made relatively easier and more economical since, lifting some waste, dead weight of the root-lumps of nonsuccessful seedlings is obviated.

There has therefore been a need for obviating the foregoing problems to result in profitably exploiting the expensive space and resources available in greenhouses for mass-scale commercial growing of seedlings. It is important to ensure that as few pots as possible are rejects or vacant, at a juncture as soon as possible after the germinating of the seeds. The present invention provides an apparatus which enables optimally the best possible utilization of the greenhouse facilities with minimal waste and the maximum number of acceptable seedlings, regardless of the plant species or the quality of the seeds. The apparatus of this invention reduces the need for manual intervention in mass growing of seedlings to a minimum, thereby resulting in increased economy. By the present invention in elevated mass growing of seedlings, as soon as possible after the germination of seeds, the trays are scanned to identify the pot locations not containing an acceptable seedling; in the exact desired locations healthy seedlings together with their root lumps may be automatically placed after first emptying the pots of the old growth medium in which the seeds did not germinate. The diagnosis of the pots to be gone through to replace the faulty seedlings is done automatically too, according to the present invention. In an exemplary embodiment of the invention which uses conveyors, the seedling trays according to the pending U.S. application Ser. No. 06/231,328 filed on Feb. 4, 1981, referred to supra, by virtue of each seedling pot comprising a plurality of finger-like openings depending from the pot top opening, it is expedient to empty the contents of a pot by displacing the contents downwards; it is equally expedient to insert a replacement seedling along with its root lump, by insertion from the top. Expediently, while inserting a healthy seedling into an identified spot in a segment tray, a hollow plunger, using controlled vacuum at the top, may be used. The vacuum gently sucks the leaves of the seedling upwards to prevent damage when the root lump is discharged downwards. Other methods of evacuation of pots and inserting replacement seedlings are within the purview of this invention and can be detailed as the constructional features of the seedling unit dictate.

SUMMARY OF THE INVENTION

The invention in its broad form resides in an apparatus for use in mass growing of seedlings in a greenhouse for automatically handling seedling units comprising pots to examine if each pot has an acceptable seedling and for optionally automatically inserting a replacement seedling into any pot which needs a replacement seedling, the apparatus comprising:

first sensor means to scan the pots and automatically identify and note pot locations which need a replacement seedling;

control means responsive to the first means to automatically cause evacuation of identified pots; and seedling inserting means responsive to the control means to automatically insert a replacement seedling in each of the evacuated pots, whereby with all the scanned pots having acceptable seedlings, the utilization of the greenhouse space is improved.

Also taught herein is a method of mass growing of seedlings in tray-like containers with a matrix of seedling cells, wherein seedling cells in which the seed does not germinate or result in an acceptable seedling are diagnosed by a sensor and emptied automatically.

In a preferred embodiment described herein, healthy seedlings are recognized by an overhead scanner bridge which also takes note of pots where germination did not take place or where there are no acceptable seedlings. The bridge includes sensors of any suitable type depending upon the type of scanning employed, optical, infrared or capacitive, etc.; a suitable form of record is provided to note and identify the location of the pots. As known to people who are skilled in the art, the means to note and identify the locations of pots could comprise, for example, a latching relay bank which may use magnetic means or groups of two opposing coils.

Having recorded the locations of the pots where replacement seedlings are needed, the apparatus next actuates an ejector device which may be in the form of a plunger under which the scanned tray is registered. The ejector device may contain one or more plungers which when actuated downwardly, resiliently deflect the pot cell strips to eject the growth medium from the pots. The growth medium in the form of lumps is dislodged and can be taken away if necessary for re-use.

The control circuit can be so set and the scanner can be so adjusted as to its threshold operating level that seedlings which are eccentric or dead in their pots can also be identified and discarded. Scanners and sensors are well known in the art, and ample related information is available from published literature. Examples of preferred capacitive type sensor scanners are given hereinafter.

At the next step, if replacement of seedlings in emptied spots is desired, the seedling unit is moved in under a second seedling unit. This is placed on a higher situated conveyor, that may have movement capabilities both longitudinally and laterally. The seedling units are adjusted so that a filled pot with a replacement seedling in the elevated unit is situated above an emptied pot in the seedling unit below and at the same time below a line of transfer devices equipped with hollow sockets (as hereinabove described) for pressing down growth medium with a seedling. The sockets fit substantially precisely inside the walls of the pot and are shaped suitably as not to damage the seedlings; the ribs of the under part of the pot are resiliently pressed apart when the socket is moved down, and the lump of growth medium together with the seedling goes with the socket and is guided into the lower pot. When the socket is moved up again, preferably, compressed air is admitted in order to loosen the socket from the growth medium. Periodically and at a suitable juncture, seedling trays may be lifted by a hoist from the lower conveyor to an upper conveyor and used for filling the blank spots in the arriving seedling units on the lower conveyor. When a seedling unit on the upper conveyor is empty it is moved away from the upper conveyor.

The sensor bridge, for example, could comprise a plurality of capacitance sensing units (or other type) which may work in conjunction with a latching relay bank. Each latching relay unit would register information corresponding to a single pot in the seedling tray being scanned, and there may be as many individual sensing units as there are pots in a tray. Each latching relay unit may comprise, for example, a set of opposing coils; alternatively the latching relay unit may be a magnetic type.

The substantial time saving in finishing the scanning operation on a mass scale will be a critical factor contributing to productivity when several hundred thousands of seedlings are to be processed.

BRIEF DESCRIPTION OF THE DRAWINGS

The invention will be more apparent from the following description of an embodiment, given by way of example and to be read and understood in conjunction with the accompanying drawings in which.

DESCRIPTION OF THE PREFERRED EMBODIMENT

Figure 1:
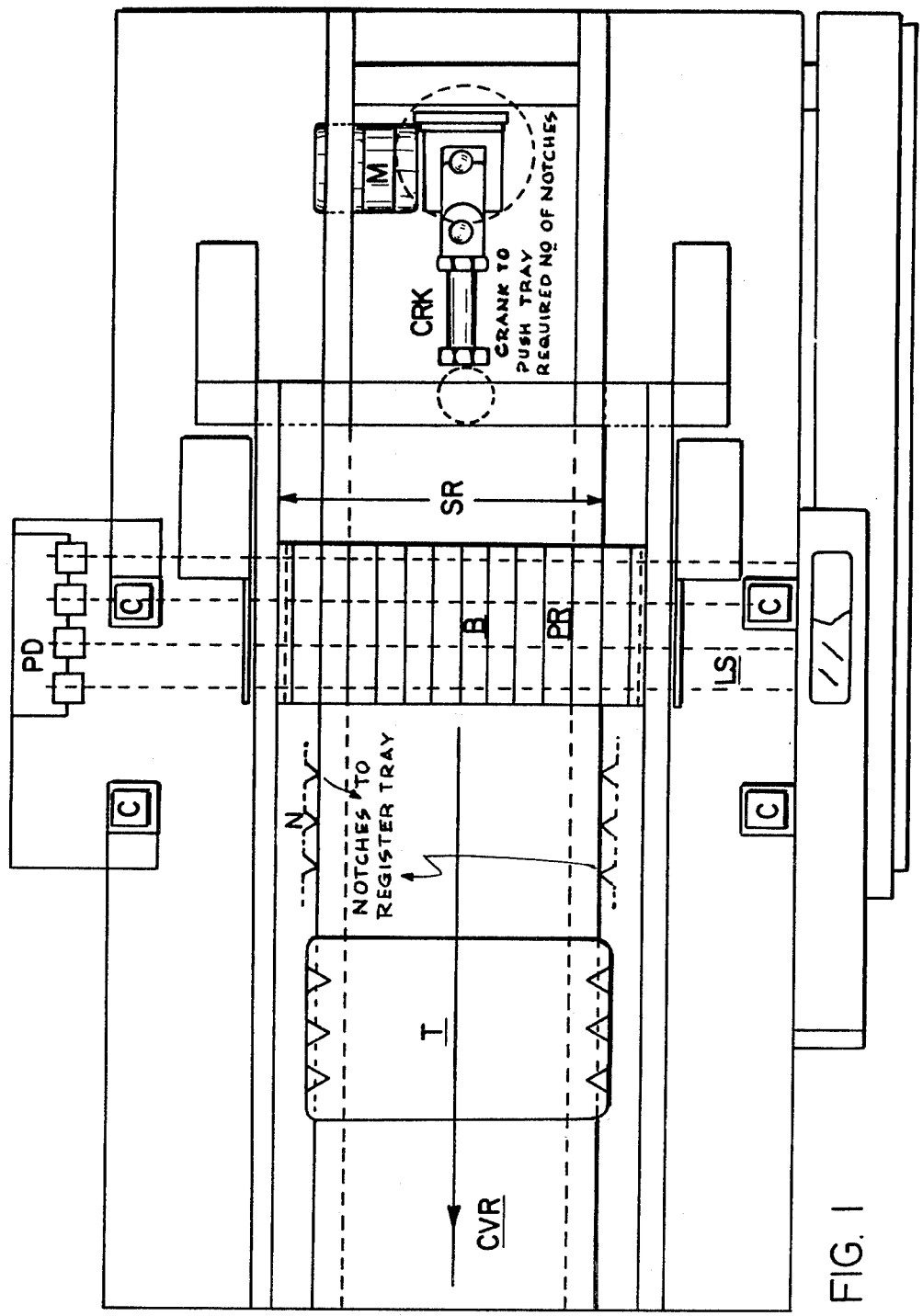
FIG. 1 shows a diagrammatic view of an illustration of a plant scanning apparatus using the invention, looking from the top.

FIG. 1 diagrammatically illustrates a view of the overall machine as seen from the top of the apparatus incorporating the principles of the present invention.

As illustrated, the apparatus comprises a bridge B which is suspended from a structure which is in turn supported by columns C. Alternatively, said structure may be suspended from above, the apparatus still being able to perform without any hindrance.

A series of trays T, each tray comprising rows and columns of plant (pot) cells containing seedlings to be inspected is disposed on conveyor CVR which is provided with notches N for selective stepped movement; the conveyor is actuated for intermittent step movement by motor M via an adjustable crank CRK which pushes a proximate tray by moving the conveyor by a predetermined amount each time, for example, four notches. The crank is expediently provided with adjustable nuts for varying the throw. Other means of bringing about this intermittent selective movement are conceivable and are within the scope of the present invention. Advantageously however, the trays may be provided with notches which are designed to engage a pair of side grippers which grab each tray; the grippers are actuated to move the tray forward by a predetermined about so as to register with the bridge B. In an alternative arrangement, the trays are provided with lugs or projections underneath which projections can register with the notches on the conveyor in order that the cell rows may be aligned with the bridge B as each tray passes under the bridge.

By virtue of the registering and alignment of the tray as described above, each row (or column) of the tray of plant cells (with seedlings) becomes aligned and registered with the sensor unit SR which will be described in greater detail hereinafter. The sensor unit inspects the pot cells in columns to determine if any of the pot cells does not have an acceptable seedling or does not have a seedling at all. The matrix locations of such pot cells which do not have an acceptable seedling are remembered and held in memory by circuitry to be described in more detail hereinafter. After a particular row of pot cells which row was memorized as to its absence of acceptable seedlings at particular locations, becomes aligned during movement with plunger row PR, the tray is momentarily stopped, and, selected plungers are operated to empty the remembered pot cells to prepare them to receive fresh replacement seedlings from, say, another tray, so that the occupancy of the cells in the tray being inspected can be restored to be full.

Each time the plungers PR act to evacuate selected pot cells, the plungers are retracted to their rest position so that the trays containing seedlings can be moved forward by a predetermined number of notches. In the event, however, any of the plungers fails to retract owing to a malfunction, the situation is diagnosed and the operation is temporarily interrupted; manual intervention is called for so as to restore the normalcy of the apparatus. If the trays are advanced when the plungers have failed to retract, some of the seedlings are likely to be malled, and, such a situation is undesirable.

In order to detect a malfunction of one or more plungers, the arrangement as illustrated uses laser beams LS which are aligned to pass through each column of plungers and impinge on photodiodes PD. Any plunger which stays in a lowered position and fails to retract because of a malfunction is immediately diagnosed by the corresponding laser being interrupted by the malfunctioning plunger, whereupon the recipient photodiode, by virtue of the absence of an incident laser beam, produces a signal. Other arrangements of detecting malfunctioning plungers are within the scope of the broad concept of the present apparatus.

In the embodiment illustrated in FIG. 1, the ganged sensors SR are advantageously provided with a means of lowering the sensors to a sensing position from a retracted rest position; in such an arrangement, the rest position facilitates an unimpeded stepwise movement of the trays which contain seedlings which project upwards.

Figure 2:
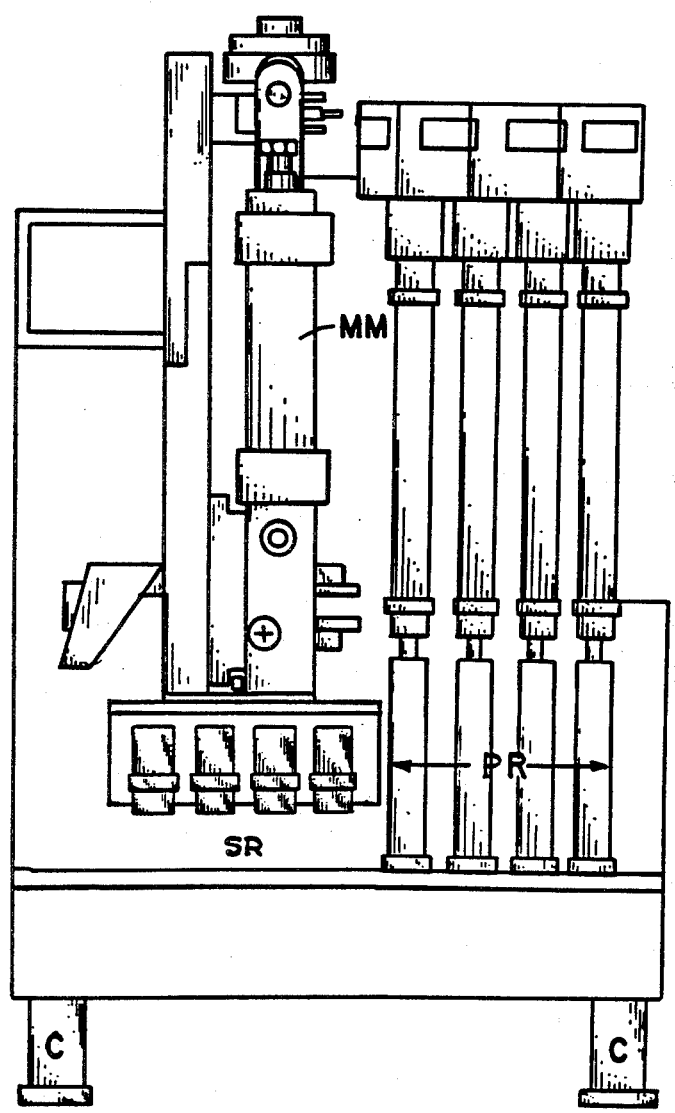
FIG. 2 is a diagrammatic side elevational view of the apparatus of FIG. 1.

FIG. 2 generally illustrates a side elevational view of the apparatus of FIG. 1 wherein the columns C, bridge B, sensors SR are shown. The mechanism MM is used to lower and raise the bridge as required for purposes of operation during sensing and evacuation of the pot cells. The mechanism MM may be hydraulically operated or may be electrically operated, or may be pneumatic. Those skilled in the art would be easily able to device the necessary elements for imparting such vertical movement including certain required limit switches to mark the end of the vertical ascent and descent; accordingly, minor details of the mechanism MM are not dealt with in further detail herein.

In the apparatus illustrated by way of example, there are 13 rows of pot cells, each row containing four cells. Any other convenient number of rows and columns may be chosen to suit specific requirements.

Figure 3:
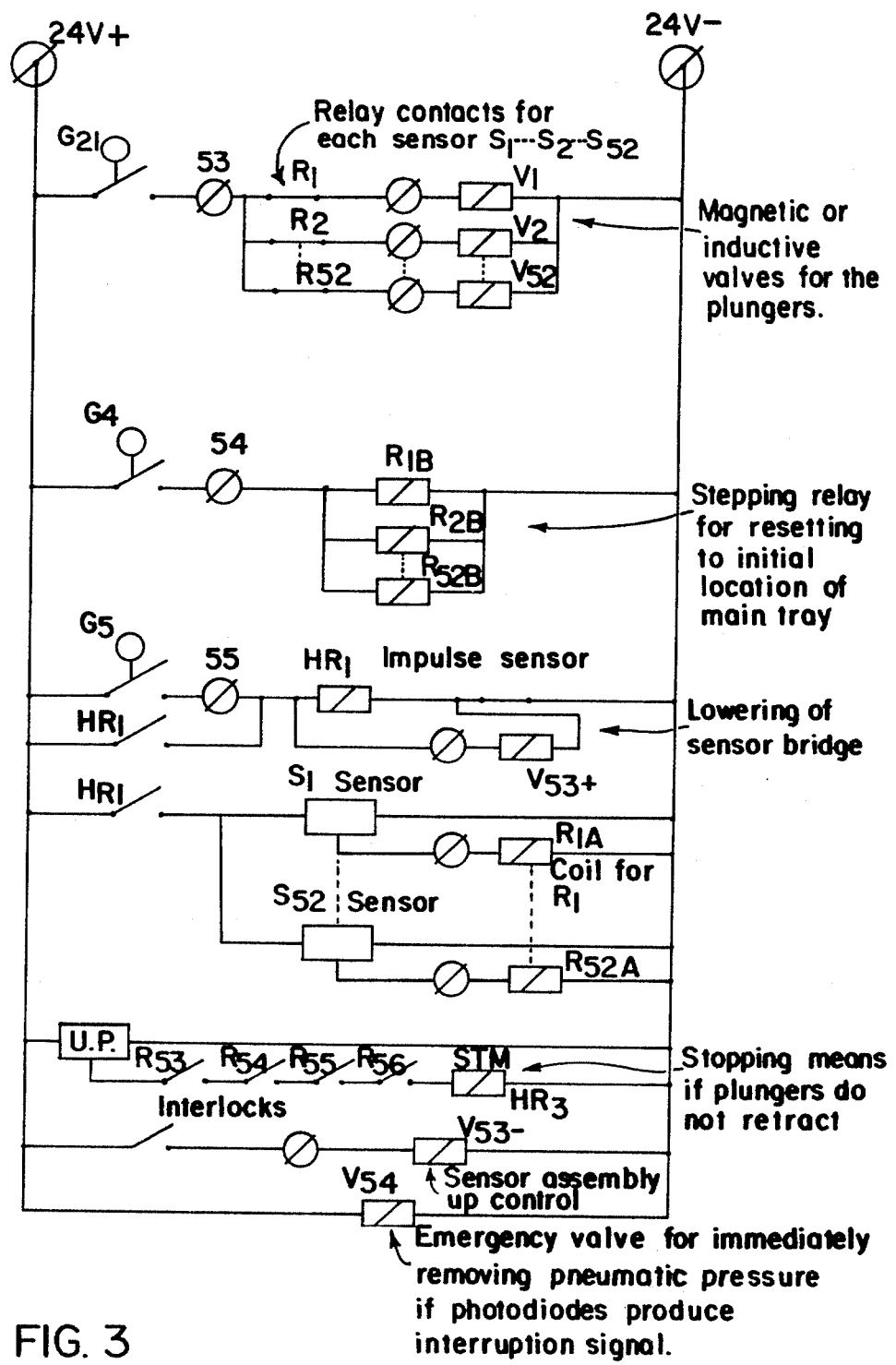
FIG. 3 is an electrical circuit showing the operation of the controls of the apparatus of FIG. 1.

FIG. 3 is a general diagrammatic illustration of circuitry which enables the operations of the sensors, plungers, movement and registration of the tray, lowering of the sensor bridge and emergency interruption if the photodiodes which operates in conjunction with the lasers produce a "non-retracted plunger" signal. As illustrated, the circuit of FIG. 3 is actuated by a 24 v d.c. supply for purposes of convenience. The relays sensors, operating coils and electrically operated valves diagrammatically shown in FIG. 3 operate across the 24 v d.c. supply. Other convenient operating voltages are admissible.

The circuit of FIG. 3 illustrates valves $V_1$ to $V_{52}$ which are respectively actuated by relay contacts $R_1$ to $R_{52}$ respectively. The valves $V_1$ to $V_{52}$ actuate the plungers, and may be preferably magnetic or inductive valves. Relays $R_{1B}$ to $R_{52B}$ are utilized as stepping relays for resetting the main tray at a desired location, with respect to an initial location. $R_1$ represents an impulse sensor which assists in the lowering of the sensor bridge B.

Connected across the 24 volts supply are paralleled sensors $S_1$ to $S_{52}$ which in turn actuate relays $R_{1A}$ to $R_{52A}$ which respectively actuate contacts $R_1$ to $R_{52}$ shown in FIG. 3 and referred to above.

Figure 4:
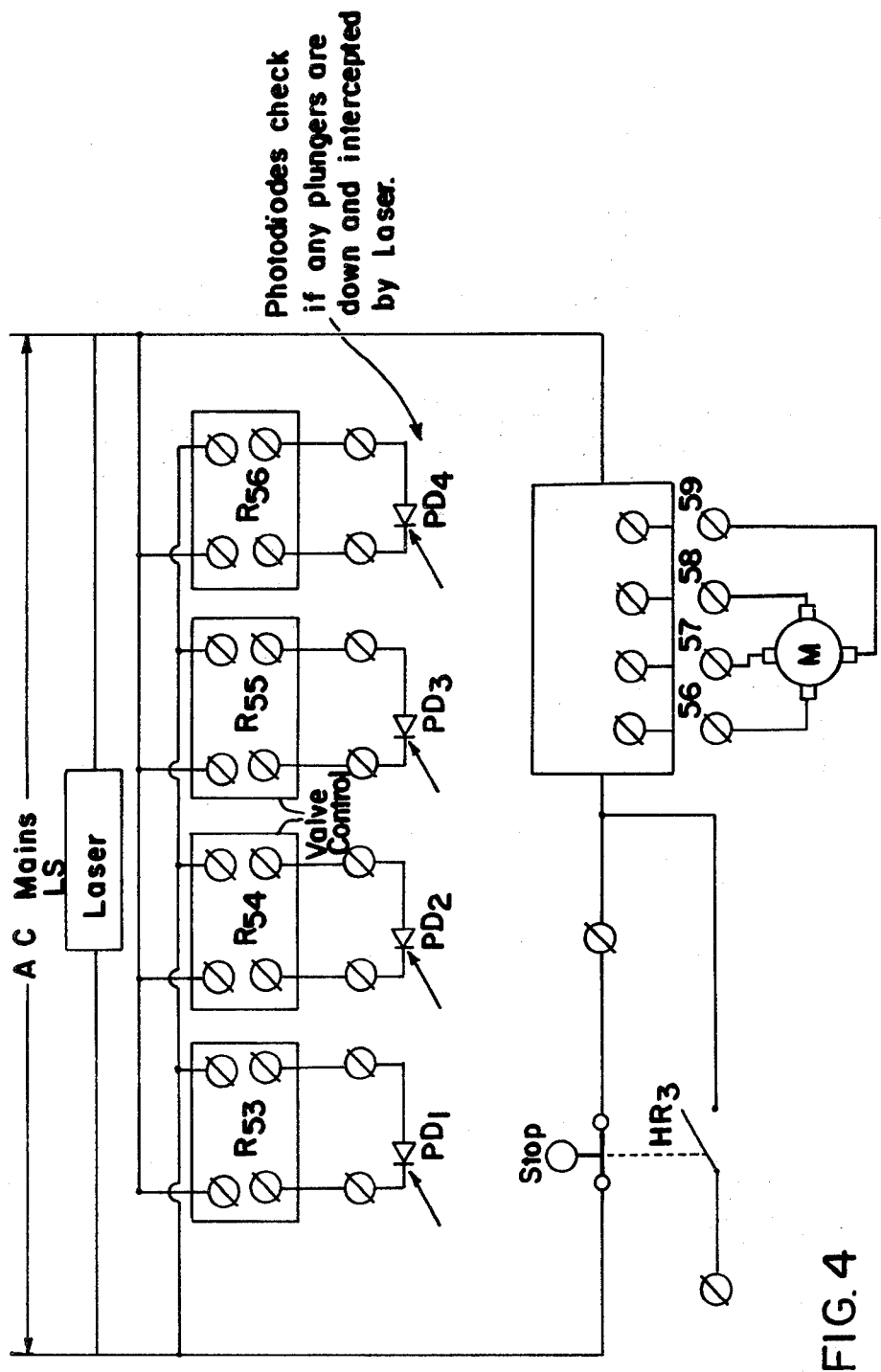
FIG. 4 is a diagrammatic showing of the laser-photodiode interrelation with respect to the conveyor motor.

The circuit includes four interlocks $R_{53}$, $R_{54}$, $R_{55}$, and $R_{56}$ which are actuated by a corresponding one of four photodiodes PD illustrated in FIG. 1 in the event any of the plungers fails to retract. As stated earlier, if a plunger malfunctions by failing to retract, the malfunctioning plunger interrupts a laser beam of the particular column of pot plungers, i.e., one of the four in the example illustrated in FIG. 1. In consequence, if any of the four interlocks $R_{53}$, $R_{54}$, $R_{55}$ and $R_{56}$ is open as a result of a nonretracted plunger in any one of the four columns during an upper position relay (UP) operation, no current flows through the relay STM whereupon relay STM will initiate stopping the operation of the apparatus. In such an event, valve $V_{54}$ which receives a 24 volts d.c. supply initiates cutting off pneumatic pressure to the apparatus so that complications are averted. $V_{54}$ is thus an emergency valve which takes care of situations which call for a temporary interruption of the operation of the apparatus. FIG. 4 diagrammatically illustrates the cooperating connections of the laser beams LS, the tray advancing motor M, the relays $R_{53}$, $R_{54}$, $R_{55}$, $R_{56}$ of FIG. 3, and photodiodes $PD_1$ to $PD_4$ which are also illustrated in FIG. 1.

As soon as any of the photodiodes $PD_1$ to $PD_4$ senses an interrupted laser (by virtue of a plunger failing to retract even though a plunger-up command has been given) the corresponding relay interlock, i.e., one of $R_{53}$, $R_{54}$, $R_{55}$, $R_{56}$ (also illustrated in FIG. 3) will open whereby the relay STM shown in FIG. 3 will not have any current flowing therethrough. In turn, this actuates the emergency valve 54 as well as interrupt the supply to the motor M.

Figure 5:
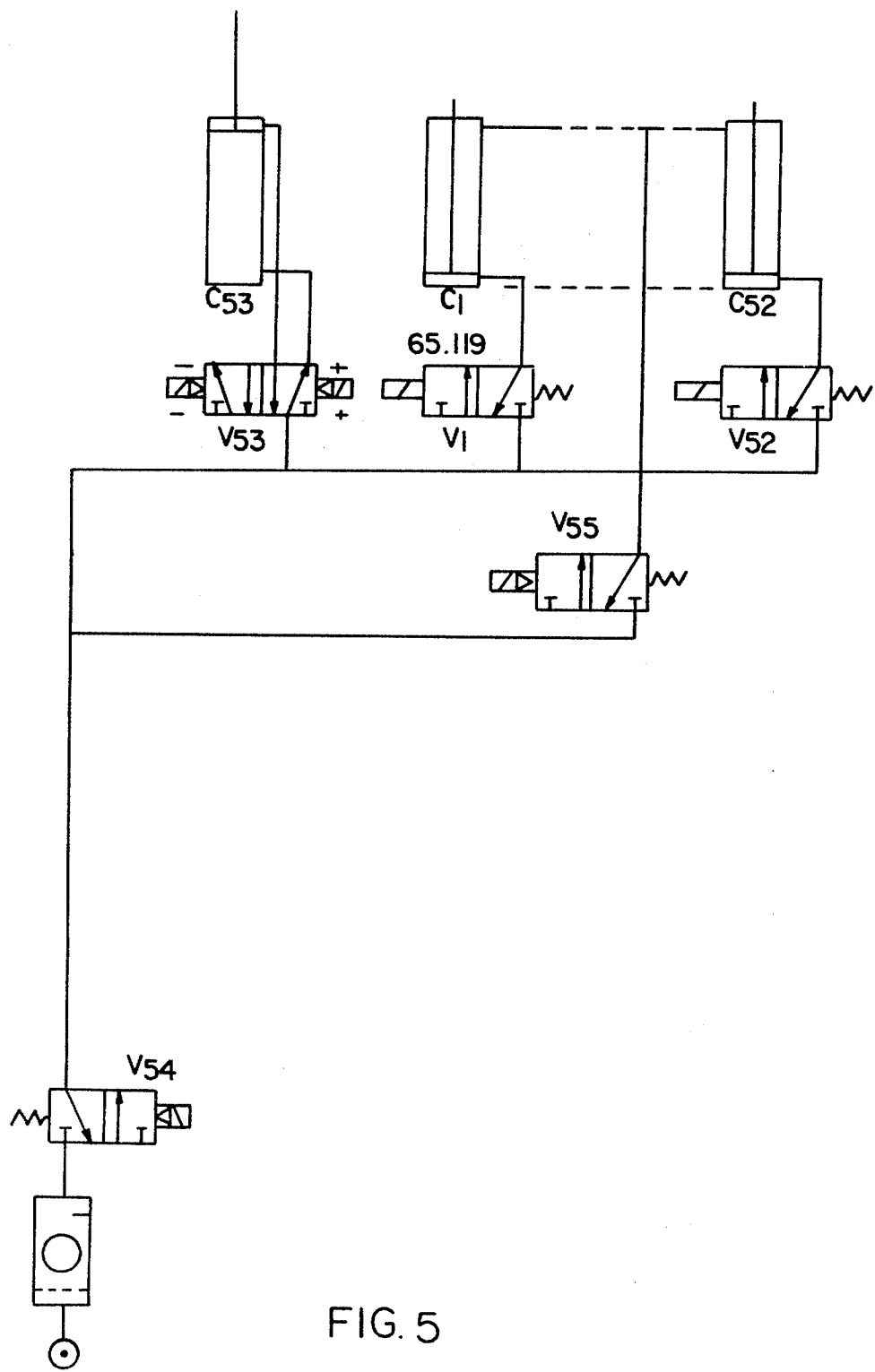
FIG. 5 is a diagrammatic illustration of the valves cooperating with the circuit of FIG. 3.

FIG. 5 illustrates how the valves $V_1$ to $V_{52}$ (illustrated in FIG. 3) are interconnected with corresponding plungers. Additionally, $V_{53+}$ and $V_{53-}$ controls are illustrated (see also FIG. 3) for lowering control and sensor bridge and raising control of sensor bridge. Capacitive sensor $C_{53}$ senses the lowering of the sensor bridge.

The capacitive sensor $C_{53}$ and the sensors $C_1$ to $C_{52}$ are generally of the proximity switch type and can be connected directly without any additions or any amplifier. Sensors of this type operate reliably with both electromechanical and static relays. These sensors work contactlessly on the capacitive principle; they sense metal, objects made of wood glass, plastic, leaves, as well as liquids. When approached by material, an output transitor in the sensor becomes live via a built in preamplifier. The sensing distance depends on the shape, size, conductivity and density of the material which causes output switching.

Once the type of the plants being sensed is known, it is easy enough to adjust the stroke of the downward travel of the sensing bridge so that acceptable seedlings are differentiated from the nonacceptable ones. Alternatively, the output signals from the sensors can be adjusted for calibration as to their magnitude so that the category of which seedlings are acceptable can easily be established. Other types of commercially available sensors are acceptable for use herein with the apparatus; at least one source for the capacitive sensors which are commercially available is Svenska Sensoren Elektronic AB, Sweden.

Figure 6:
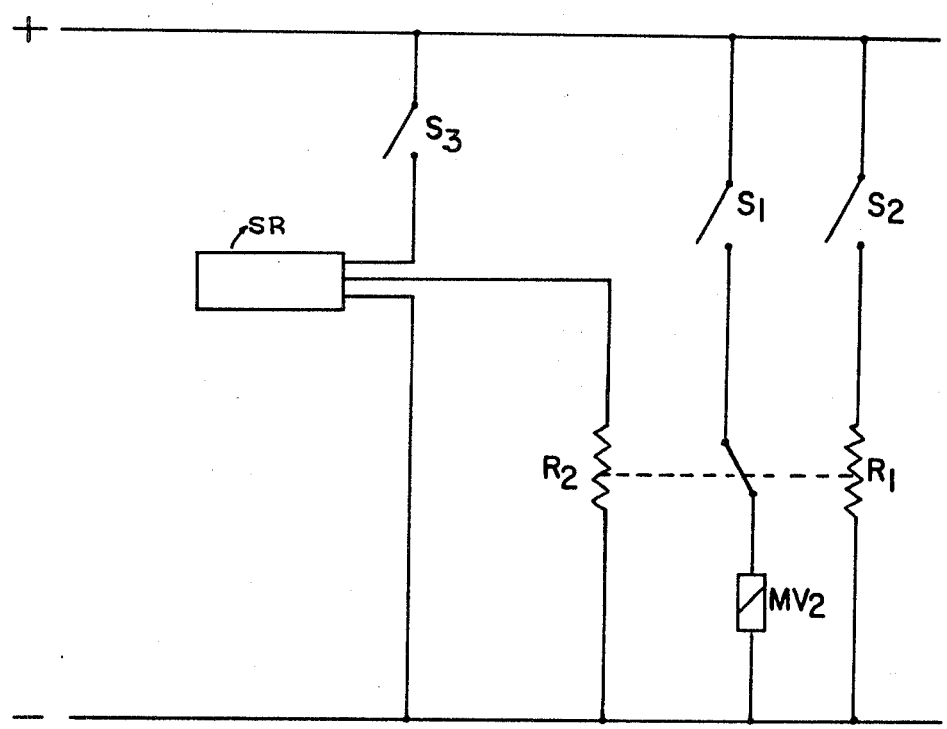
FIG. 6 shows a subcircuit of the operation of a capacitive sensor in association with a relay coil.

FIG. 6 diagrammatically illustrates the preferred manner of connection of a capacitive sensor to a relay coil, cooperating with a contactor and a valve. Minor details of circuitry will be intelligible to those who are skilled in the art.

As described hereinbefore, the pot cells which are identified by the capacitive sensors as needing a plant replacement are first identified and evacuated; the emptied pot cells may be given healthy seedlings if so desired. Preferably, donor trays which may be replete with healthy seedlings are arranged on a second conveyor (not shown) which is located at a level higher than the level of the first conveyor. The apparatus advantageously includes hoisting means (not shown) to lift donor trays from the lower level to the level of the second conveyor. To facilitate seedling replacement, compressed air may be used in the donor tray cells to release the root lumps for transfer. The locations of the emptied pots can be memorized and used for inserting healthy seedlings thereinto; alternatively, the pot-cell trays can be scanned again if necessary to determine where the emptied locations are. In either event, a tray containing healthy plants in all the cells is aligned at the top of the scanned tray, and hollow cylinder-like plungers are used to push root lumps from good pot cells down into the recipient pot cells which have been initially evacuated. To this end, advantageously, the hollow cylinder-like plunger members, which are made to move downwardly, may be provided with means causing partial-vacuum at the top of the hollow cylinders, whereby the leaves of the healthy plant (which is intended as a replacement into an emptied pot cell) will be sucked up initially into the cavity of the hollow cylinder so as to obviate damage to the leaves. Any other convenient method of avoiding damage to the leaves of the replacement plant seedlings is also acceptable.

Other alternative methods of emptying the unacceptable pot cells, such as pneumatically blowing or sucking the growth medium are within the purview of this invention. Likewise, other methods of insertion of a healthy seedling into an empty pot, other than ejecting the seedling root lump from a pot situated above are also within the scope of this invention. The particular method of evacuation and seedling replacement is largely governed by the seedling unit construction, and partly by design choice.

It is seen from the above that trays which are filled where the replacements were needed are complete and can be put back in the greenhouse environment for final growth stages. Since the processed seedling trays have all the pots therein occupied by acceptable, useful seedlings, any further greenhouse facility allocated to such trays, as well as any further labor spent on them such as in handling and transportation and replanting will result in maximal returns unlike with trays which were never treated according to the invention.

While only a preferred embodiment has been described hereinabove, the invention is not to be taken as limited to the various details thereof, as modifications and variations thereof may be made without departing from the spirit and scope of the invention.

What is claimed is:

1. In a system of elevated mass growing of plant seedlings for subsequent replanting, the mass growing being in reusable units of the type having a plurality of pot cells joined together in side-by-side relationship in an array forming a tray-like structure, a method to ensure that all the pots in each tray are occupied by acceptable seedlings, the method comprising:
   providing means to controllably advance the trays past a sensing station and sensing the array of pots in each tray by sensor means to identify pot-locations in the array which do not have an acceptable seedling;
   providing means for holding the identified locations in mechanical, electrical or electronic memory; and
   selectively evacuating the identified pot-locations by mechanically actuated means in preparation for receiving acceptable replacement seedlings; and
   providing means replacing seedlings at the evacuated locations; and forcing the seedlings to a transplant stage.

2. Apparatus for use in mass growing of seedlings in a greenhouse for automatically handling reusable seedling units comprising pots arranged in matrix form in a tray, to examine if each pot has an acceptable seedling and for automatically preparing certain examined pots to receive a replacement seedling, the apparatus comprising:
   first sensor means to scan the pots automatically to identify and note pot locations which need a replacement seedling;
   control circuit means responsive to the first means to automatically initiate evacuation of identified pots;
   means responsive to said control circuit means to evacuate said identified pots;
   seedling inserting means responsive to the control circuit means to automatically insert a replacement seedling in each of the evacuated pots, whereby with all the scanned pots having acceptable seedlings, the utilization of the greenhouse space is improved.

3. Apparatus as claim 2 wherein said scanning means comprises optical scanning means.

4. Apparatus as in claim 2 wherein said scanning means comprises capacitance scanning means.

5. Apparatus as in claim 2 wherein said scanning means comprises ultrasonic scanning means.

6. Apparatus as in claim 2 wherein said scanning means comprises infrared scanning means.

7. Apparatus as in claim 2 including means to selectively cause evacuation of a pot in response to said control circuit means.

8. Apparatus as in claim 2 including a mechanical plunger responsive to said control means to selectively cause evacuation of a predetermined pot.

9. Apparatus as in claim 8 including at least one conveyor on which the pots are situated at the time of scanning and insertion of replacement seedling.

10. Apparatus for use in mass growing of seedings in a greenhouse for automatically handling reusable seedling units of the type having a plurality of pots joined together in side-by-side relationship in an array to form a tray-like structure, to ensure that all the pots in a tray are occupied by acceptable seedlings, the apparatus comprising:
    first capacitive sensor means to scan the array of pots automatically to identify and note pot locations which need a replacement seedling;
    control circuit means responsive to the sensor means to cause evacuation of identified pots; and
    seedling inserting means responsive to the control means to insert replacement seedlings one in each of the evacuated pots.

11. Apparatus as in claim 10 adapted for use with seedling units having a plurality of bottomless pots, the apparatus further comprising at least one conveyor means on which seedling units to be scanned are disposed.

12. Apparatus as in claim 11 wherein said means to scan comprises optical scanning means.

13. Apparatus as in claim 11 wherein said means to scan comprises capacitance scanning means.

14. Apparatus as in claim 11 wherein said means to scan comprises ultrasonic scanning means.

15. Apparatus as in claim 11 wherein said means to scan comprises infrared scanning means.

16. Apparatus as in claim 11 which includes pneumatic means to evacuate identified pots.

17. Apparatus as in claim 11 which includes a mechanical plunger means which, responsive to the control circuit means, moves downwardly into an identified pot to eject a lump of growth medium from the identified pot downwardly to evacuate the identified pot.

18. Apparatus as in claim 17 including a second conveyor means responsive to said control circuit means and located above the first conveyor means, said second conveyor having thereon one or more donor seedling units from which replacement seedlings can be transferred to evacuated pots of seedling units on the first conveyor.

19. Apparatus as in claim 18 including a transfer means which is responsive to said control circuit means, said transfer means including a socket capable of vertically downward movement for facilitating transfer of a replacement seedling from the area of the second conveyor into a selected evacuated pot of a seedling unit located on the first conveyor.

20. Apparatus as in claim 19 further including means to admit compressed air into the region of the socket in such manner as to facilitate release of a lump of growth medium of said replacement seedling from its corresponding pot.

* * * * *